F. G. WISELOGEL.
Cellular-Press.
No. 216,075. Patented June 3, 1879.
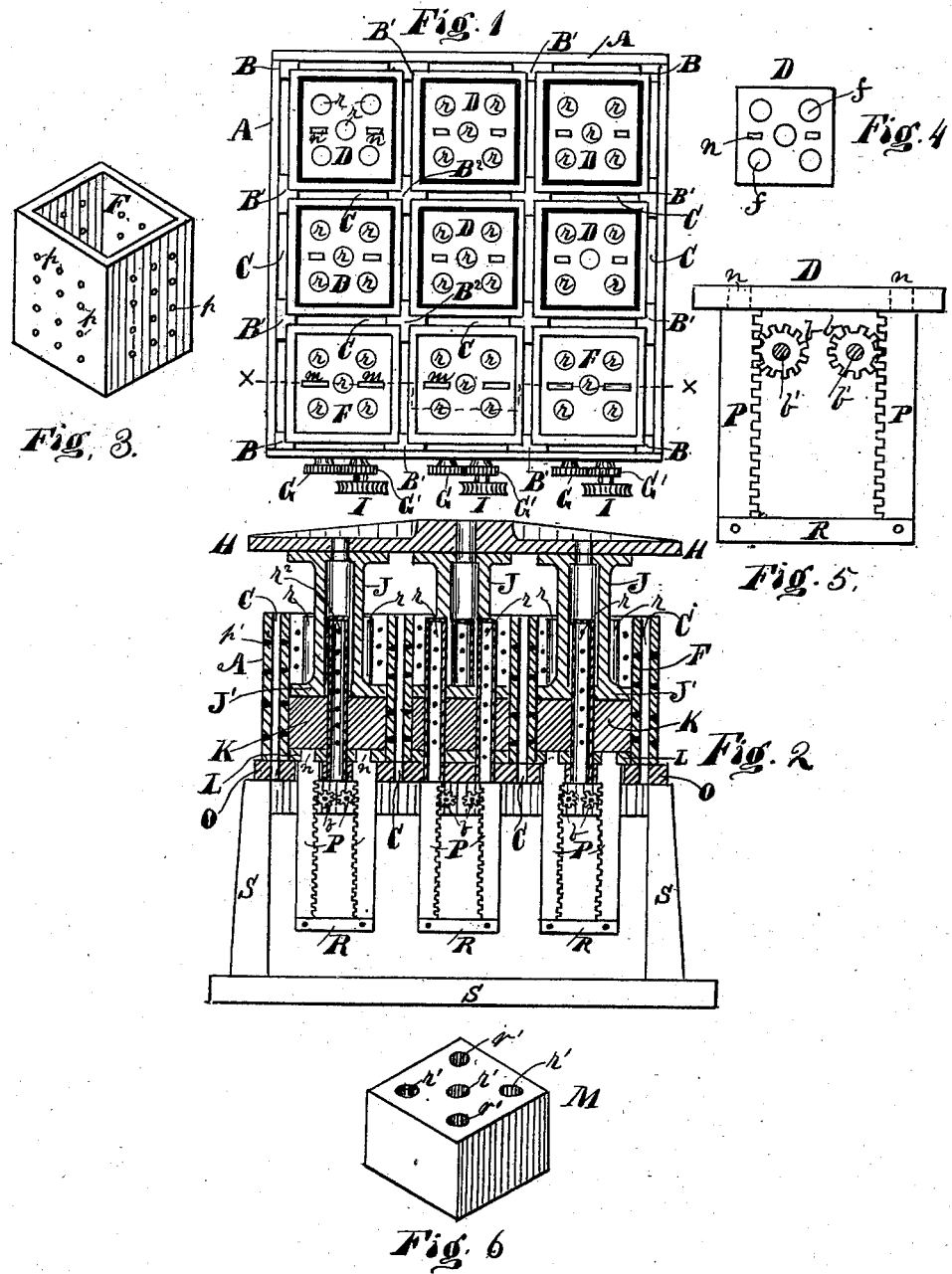

UNITED STATES PATENT OFFICE.

FREDERICK G. WISELOGEL, OF INDIANAPOLIS, INDIANA.

IMPROVEMENT IN CELLULAR PRESSES.

Specification forming part of Letters Patent No. 216,075, dated June 3, 1879; application filed April 4, 1879.

*To all whom it may concern:*

Be it known that I, FREDERICK G. WISELOGEL, of Indianapolis, in the county of Marion and State of Indiana, have invented a new and useful Cellular Press, for pressing moisture from animal or other substances where immense pressure is required to remove the moisture, as will be hereinafter fully set forth and described.

Prior to my invention there has been great difficulty in pressing out the moisture from animal substances used for fertilizing purposes, the greatest difficulty being in providing a means for carrying off the moisture from various parts of the compressed material, so as to render the pressed blocks more dense, and in a condition to dry more uniformly and rapidly after pressing, and expedite the grinding of the same.

The object of my invention is to provide a ready means of carrying off the moisture from various parts of the compressed block while under pressure, and also to provide a means for readily removing said block of compressed matter from the cells of the press, leaving said blocks in a good condition for handling.

My invention consists, mainly, in the new construction, arrangement, and application of devices; also in the new combination of old elements, all of which, singly or combined, are deemed essential in my newly-organized cellular press, whereby new and useful results are produced, as will be hereinafter fully described and set forth.

In the accompanying drawings, in which like letters of reference in the different figures indicate like parts, Figure 1 represents a plan or top view of the cellular press, with the plungers removed, showing the arrangement of cells and frame, and also the spaces between the cells and the frame for the passage of moisture. Fig. 2 is a sectional view taken vertically through the press and plungers at the line $x\ x$, Fig. 1, showing the interior arrangement of parts and the blocks of matter compressed. Fig. 3 represents a perspective view of one of the cells removed from the press. Fig. 4 represents a plan view of one of the follower-plates. Fig. 5 represents an enlarged side view of the follower-plate and the rack and gear mechanism for operating the same; and Fig. 6 represents a perspective view of the block of matter after being pressed and removed from the press.

Referring to the drawings, A A represent the outside frame, in which are located a series of cells, F. The frame A may be perforated with a series of holes, $p'$, to permit moisture to pass through. The cells F are, by preference, made square, but may be made round, or in various other shapes, and are also perforated with holes $p$ to permit the water to pass through.

The cells F are arranged in the frame A, with ribs or blocks B $B^1$ $B^2$ between them, thus leaving spaces C C between each cell, and also between the cells and frame A. The bottom O is securely bolted to the frame A and cells or partitions, and is provided with a series of slots corresponding with spaces C between the cells, so as to permit any water that is pressed out of the material through holes $p$ in the cells F to pass through.

The bottom O is also perforated with a series of two holes, $m\ m$, in each cell, to permit the rack-rods P P, that are attached to the follower-blocks D, to pass through, as shown in Figs. 1, 2, and 5. The bottom O is also perforated with a series of holes in each cell, in which the perforated pipes $r\ r$ are securely held, thus forming a passage near each corner and at the center of the cells F, for the water to pass through as the material in the cells is pressed, as shown in Fig. 2.

The upper ends, $n$, of the racks P P are riveted into the follower-blocks D, and the racks P P are operated to rise up or down, carrying with them the followers D, by the pinions $b\ b$. Said pinions are mounted on shafts $b'\ b'$, and said shafts are supported by suitable bearings formed below the press-box.

The lower ends of each set of racks P P are united together by the bars R, thus preventing them from spreading.

The shafts $b'\ b'$ project beyond the edge of the frame A, and are provided with two pinions, G G, which work together in gear; and one of each set of the shafts $b'$ projects farther than the other shafts, and each projecting shaft may be provided with a worm-wheel, I, and all the worm-wheels may be connected together by a screw, (not shown,) so as to rotate all the shafts at one time, and raise or lower all of the follower-blocks D at one time; or the worm-wheels I and screw (not shown) may be omitted, and cranks attached to the long shafts to rotate them; or the racks P P and pinions $b$ $b$ G G may be omitted and the followers D attached to a platen similar to that above, and operated by a screw or lever, or other similar means, to force the blocks of compressed material upward.

The platen H H may be attached to any ordinary form of power-press, and is made sufficiently strong to withstand a tremendous pressure. To the bottom of said platen are secured hollow plungers J, having heads J' to correspond with the cells F, and each head J' of the plungers is provided with holes corresponding with the pipes $r$, for the purpose of allowing the plunger to move down over them. The center pipe, $r$, of each cell operates in the hollow part of each plunger, as shown in Fig. 2, and the outside pipes operate in holes formed in the corners of the head J'.

The whole apparatus is mounted on a suitable frame, S S, as shown.

The operation of my improved apparatus is as follows, to wit: The platen H is raised, lifting the plungers J J' from the cells F, and the followers D lowered down to the bottom. The material to be pressed is then inserted in the cells, after which the platen H is moved down by any ordinary power mechanism. The perforated tubes $r$ passing through the holes of the head J' as the plungers and platen are pressed down, the material in each cell is compressed, and the moisture or water is forced through the holes $p$ in the sides of the cells, also through the holes in the pipes $r$, near the corners, and at the center of the pressed material, the water running off from the spaces C and bottom of the pipes $r$.

The material in the cells is left under pressure for a short time, after which the platen and plungers are removed, and the pressed material is forced upward out of the cells by the followers D and their operating mechanism as before described. The blocks of pressed material when removed from the cells are in the form shown in Fig. 6, and in good condition to handle.

There may be two or more sets of cellular press-boxes arranged to move under one platen. Thus one set may be under pressure, while the other set is in a position to have the blocks of pressed material removed from the cells, and the cells refilled, after which the plungers may be withdrawn from the other set, and the one last filled moved under the platen to be pressed while the last pressed blocks are removed, as before described. The perforated pipes $r$ are provided with plugs $r^2$ in the upper ends, to prevent material from entering said pipes while filling the cells. These plugs are to be removed when the pipes become clogged with material squeezed through the holes, and said pipes are cleaned by forcing a rod down through them.

What I claim as new, and desire to secure by Letters Patent, is—

1. The cells F, having perforated sides, combined with the frame A, bottom O, and ribs or cleats B B$^1$ B$^2$, whereby said cells are provided with a means of carrying off water as the material is pressed in the cells, substantially as described, for the purpose specified.

2. In combination with the cells F, the bottom O, provided with a series of perforated pipes, $r$, as and for the purpose specified.

3. In combination with the cells F and bottom O, provided with a series of perforated pipes, $r$, the plunger J, having perforated heads J', to slide over said pipes $r$, as and for the purpose specified.

4. In combination with the cells F and bottom O, provided with a series of perforated pipes, $r$, with plungers J, having perforated heads, J', the follower D, also perforated with holes $r^1$, to slide on the pipes $r$, substantially as described and set forth.

5. In combination with a press-box having a series of perforated cells, and surrounded by spaces C, the follower-blocks D, racks P P, and pinions $b$ $b$, as and for the purpose specified.

In testimony whereof I have signed my name to this specification in the presence of two subscribing witnesses.

FREDERICK G. WISELOGEL.

Witnesses:
 E. O. FRINK,
 D. F. SPEES.